UNITED STATES PATENT OFFICE.

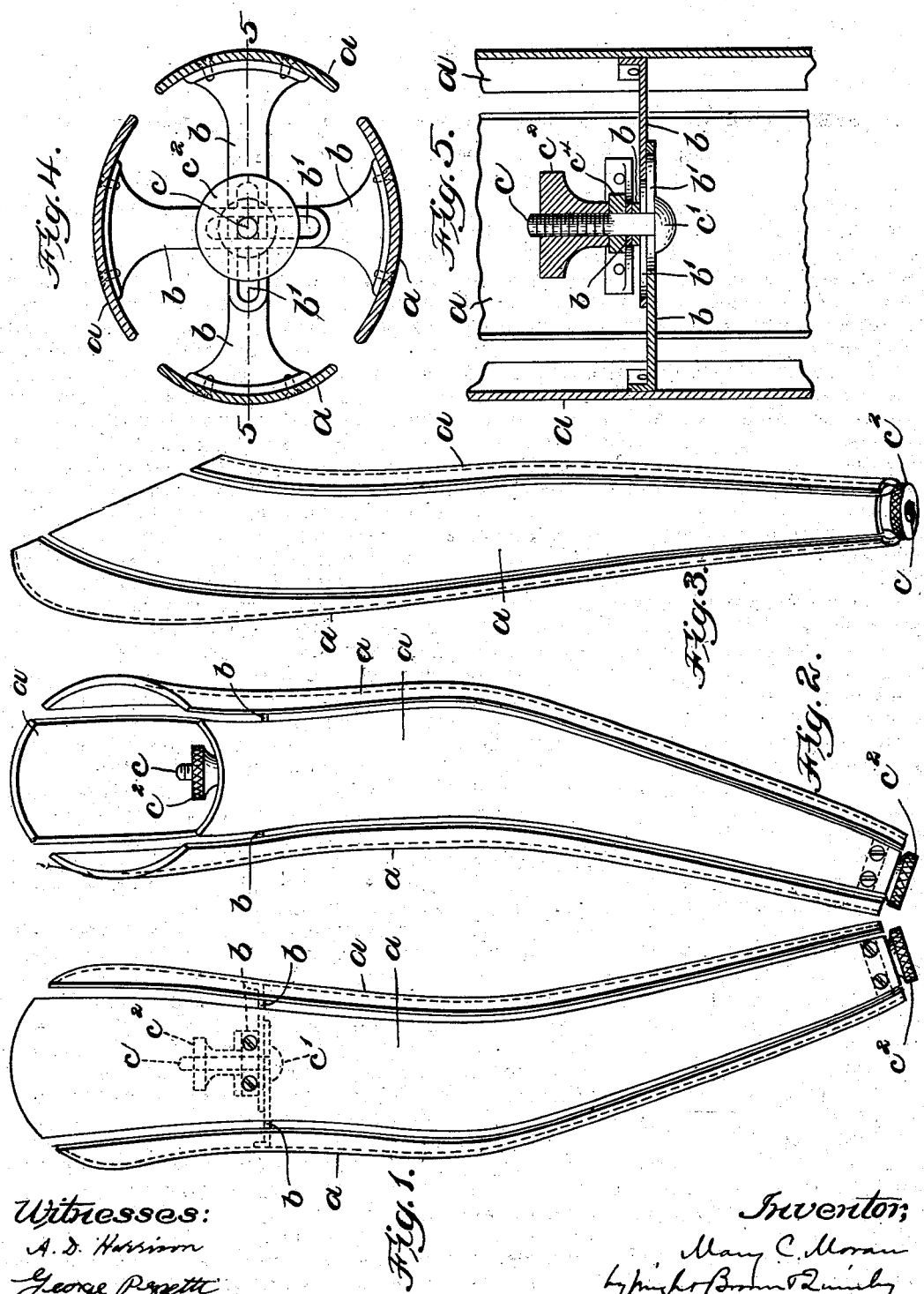

MARY C. MORAN, OF NEWTON, MASSACHUSETTS.

ADJUSTABLE SLEEVE-FORM.

SPECIFICATION forming part of Letters Patent No. 700,539, dated May 20, 1902.

Application filed December 5, 1901. Serial No. 84,775. (No model.)

*To all whom it may concern:*

Be it known that I, MARY C. MORAN, of Newton, in the county of Middlesex and State of Massachusetts, have invented certain new and useful Improvements in Adjustable Forms for Garment-Sleeves, of which the following is a specification.

This invention has for its object to provide an adjustable form, principally for the use of dressmakers, which can be adjusted to an approximation of the form of the human arm when the latter is at rest or hanging in its natural position, and to which a sleeve can be fitted.

The invention consists in the improved form which I will now proceed to describe and claim.

Of the accompanying drawings, forming a part of this specification, Figures 1, 2, and 3 represent different elevations of a sleeve-form embodying my invention. Fig. 4 represents a section on line 4 4 of Fig. 3. Fig. 5 represents a section on line 5 5 of Fig. 4.

The same reference characters indicate the same parts in all the figures.

In carrying out my invention I make a tubular sleeve-shaped form, which is a close approximation to the natural shape of the human arm when the latter is hanging loosely, and is composed of a plurality of longitudinally-extending sections $a$, preferably four in number, as shown in the drawings, although any other desired number may be employed. These sections are curved both lengthwise and crosswise, as indicated in the drawings, the sections tapering from their upper to their lower ends and gradually increasing in radius of curvature in cross-section from their lower to their upper ends, so that the diameter of the upper end portion of the form is greater than that of the lower end portion. The sections are of different lengths and their upper ends are formed to give the upper end of the form the beveled or oblique form illustrated in Figs. 2 and 3.

The sections $a$ are adjustably connected in such manner that the diameter of the tube can be increased or diminished, the adjustable connections being preferably so arranged that the diameter of either end portion can be varied independently of the other end portion. The adjustable connections between the sections shown in this embodiment of my invention comprise arms $b\ b$, affixed to the sections and projecting inwardly at a substantially right angle to the sections and having slots $b'\ b'$, and clamping devices comprising screw-threaded bolts $c$, having heads $c'$ and nuts $c^2$, engaged with the threaded portions of the bolts, and washers $c^4$, on which the nuts $c^2$ bear. The arms $b$ are arranged so that their inner ends overlap each other and portions of their slots coincide and receive the bolt $c$, the head $c'$ of the bolt bearing against one side of the series of arms and the washers $c^4$ against the opposite side of said series. By loosening the nut $c^2$ the arms are released, so that the sections can be adjusted, and by tightening said nut the arms are securely clamped together to hold the sections at the desired adjustment. As shown in Figs. 1, 2, and 3, there are two sets of said clamping devices, one near the upper or larger end of the form and the other near the lower or smaller end.

Owing to the arrangement of the arms $b\ b$ at a substantial right angle to the sections $a\ a$ and with their inner ends overlapping and secured together, the said sections are held in the desired relative positions without employing an interior rod or shaft and with more firmness than if said arms were arranged at an angle to said sections.

The sections may be made of wood, papier-mâché, or any other suitable material, the material being preferably of such nature that it can be molded to shape and will be free from liability to warp or lose its shape.

I do not limit myself to the details of construction here shown and may variously modify the same without departing from the spirit of my invention.

I claim—

1. A tubular sleeve-form composed of a plurality of tapering longitudinal sections collectively forming a longitudinally-divided arm-shaped tube, each section being externally convex in cross-section the radii of cross-sectional curvature gradually increasing from its lower to its upper end, and adjustable connections between said sections whereby the diameter of the tube may be varied.

2. A tubular sleeve-form composed of a plurality of tapering longitudinal sections collectively forming a longitudinally-divided arm-shaped tube, each section being externally convex in cross-section, the radii of cross-sectional curvature gradually increasing from its lower to its upper end, and a plurality of sets of adjustable connections between said sections, whereby the diameter of the tube may be varied at either end portion.

3. A tubular sleeve-form composed of a plurality of longitudinal sections collectively forming a longitudinally-divided arm-shaped tube, inwardly-projecting slotted arms affixed to said sections and having their inner ends overlapped, and clamps engaged with the overlapped ends of said arms within the tube.

In testimony whereof I have affixed my signature in presence of two witnesses.

MARY C. MORAN.

Witnesses:
DAVID J. MALONEY,
JOHN J. EGAN.